United States Patent [19]

Monaco

[11] 4,266,502
[45] May 12, 1981

[54] SEED APPLYING APPARATUS FOR FOOD PRODUCTS

[75] Inventor: George Monaco, Little Neck, N.Y.

[73] Assignee: Stella D'oro Biscuit Co. Inc., Bronx, N.Y.

[21] Appl. No.: 90,290

[22] Filed: Nov. 1, 1979

[51] Int. Cl.³ .......................... B05C 1/08; B05C 5/02; B05C 19/00

[52] U.S. Cl. .................................. 118/16; 118/18; 118/24; 118/308

[58] Field of Search ................... 118/16, 18, 24, 308, 118/13, 325, 312

[56] References Cited

U.S. PATENT DOCUMENTS

| | | |
|---|---|---|
| 1,482,473 | 2/1924 | Lord et al. |
| 1,608,302 | 11/1926 | Cloud |
| 2,789,926 | 4/1957 | Finholt et al. ................... 118/308 X |
| 3,057,730 | 10/1962 | Morck |
| 3,065,079 | 11/1962 | Elliott |
| 3,738,313 | 6/1973 | Heim ...................................... 118/16 |
| 3,759,218 | 9/1973 | Korstvedt ......................... 118/24 X |
| 3,885,519 | 5/1975 | Orlowski ................................ 118/16 |
| 3,894,508 | 7/1975 | Burgess .................................. 118/19 |
| 4,073,261 | 2/1978 | Teeny et al. ........................... 118/16 |

Primary Examiner—John P. McIntosh
Attorney, Agent, or Firm—Albert F. Kronman

[57] ABSTRACT

A food product in the form of an elongated strip is provided with a coating of seeds by directing it upon the loading end of a conveyor belt, passing it through a wetting station and thereafter directing it from the discharge end of the conveyor belt onto a grooved drum. A quantity of seeds carried by a hopper is directed onto a surface of the drum in the area just prior to the contact point of the food product with the drum. The seed is received upon the bottom of the grooves in the drum and around the sides and top of the food product. A pressure roller in contact with the periphery of the drum urges the seeds into firmer contact with the food product. Excess seeds are recaptured and the seeded food product is directed from the apparatus.

16 Claims, 4 Drawing Figures

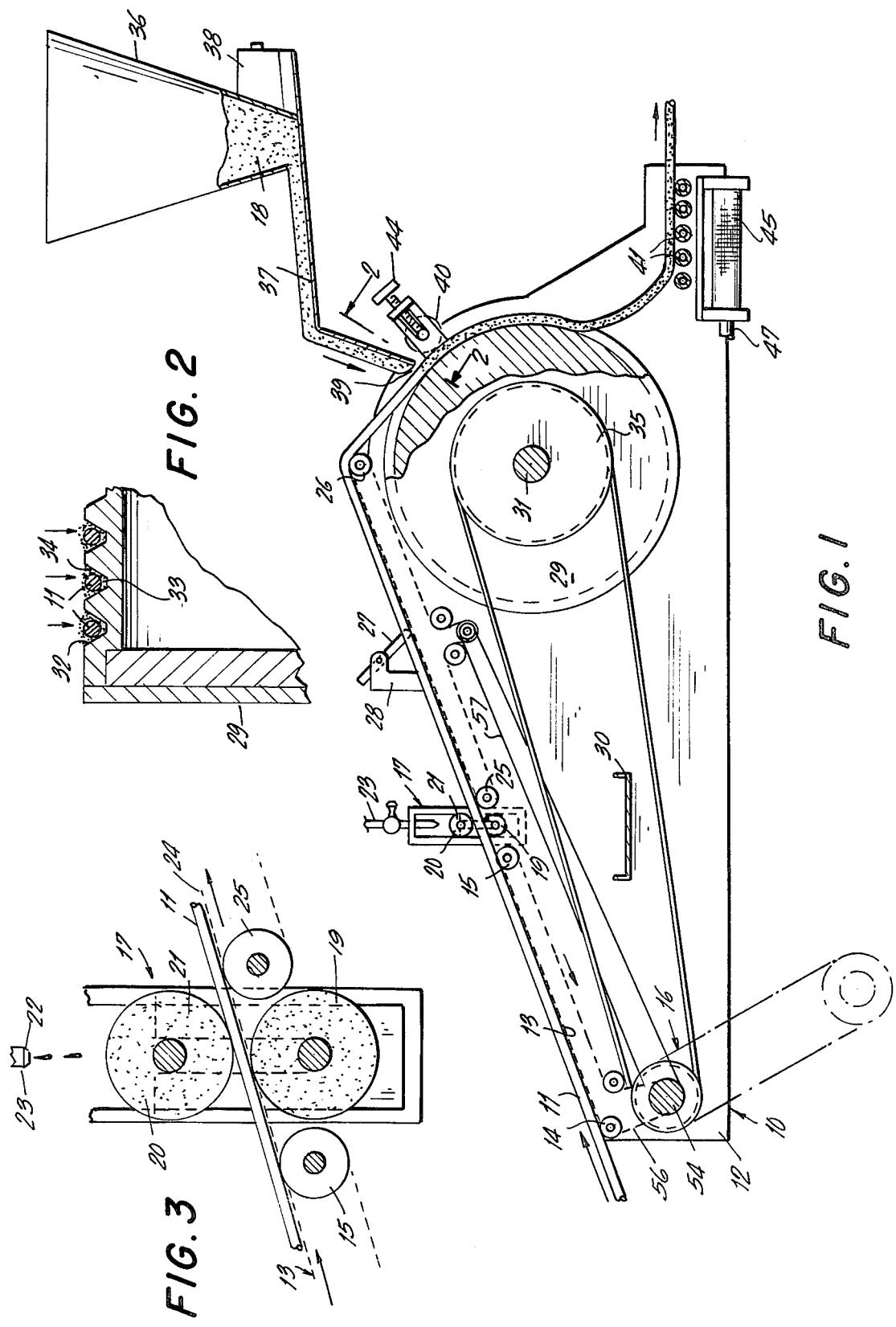

SEED APPLYING APPARATUS FOR FOOD PRODUCTS

BACKGROUND OF THE INVENTION

Many foods such as breads, bread sticks, cookies and the like are made more enjoyable by the addition of a coating of edible seeds. These seeds are normally applied by sprinkling them upon the tops of the product as it is being made. Since the flavor of the product is largely the result of the seeds, it is desirable to have as many seeds as possible on the finished product.

Continuous manufacture of foods has heretofore made it impractical or uneconomic to apply seeds to a food product, particularly where the manufacturing equipment employed a conveying means such as an endless belt. In such operations, seeds have been placed on the belt and discrete food portions placed upon the seeds. Thereafter, additional seeds were dropped over the food portions from a supply source in an effort to get more seeds on the product.

The present invention provides a continuous seed applicator for food products which is compatible with high speed large scale manufacturing techniques and which will automatically apply seeds to all surfaces of said food products.

Another object of the present invention is to provide a seed applicator which will make economical use of the seeds by preventing waste.

A further object of the present invention is to provide a seed applicator which will operate for long periods of time without excessive accumulation of seeds.

Still another object of the present invention is to achieve a maximum adherence of seeds to the food product in its finished state.

SUMMARY

In one embodiment of the present invention elongated strips of dough (hereinafter "dough strings") coming from a dough machine are directed upon a first conveyor belt. The dough strings are carried by the first belt into a wetting station and between sponge-like rollers. A second conveyor belt receives the strings coming from the rollers and directs them on to a large grooved drum. Just before the dough strings make contact with the grooves in the drum, a quantity of seeds is directed upon the drum and into the grooves. An additional amount of seeds are sprinkled on the top and sides of the wet dough strings. Seeds are thus placed completely around the dough strings. A pressure roller disposed against the periphery of the grooved drum serves to urge the seeds into firmer contact with the dough strings. Excess seeds fall from the grooved drum and are captured for reuse.

BRIEF DESCRIPTION OF THE DRAWING

In the accompanying drawings forming part hereof similar parts have been given the same reference numerals, in which drawings;

FIG. 1 is a somewhat diagrammatic view in side elevation of a complete embodiment of the present invention with certain parts broken away.

FIG. 2 is a fragmentary view, somewhat enlarged, taken on line 2-2 in FIG. 1.

FIG. 3 is a fragmentary view, somewhat enlarged of the dough wetting station shown in FIG. 1.

DETAILED DESCRIPTION

Figure 4:
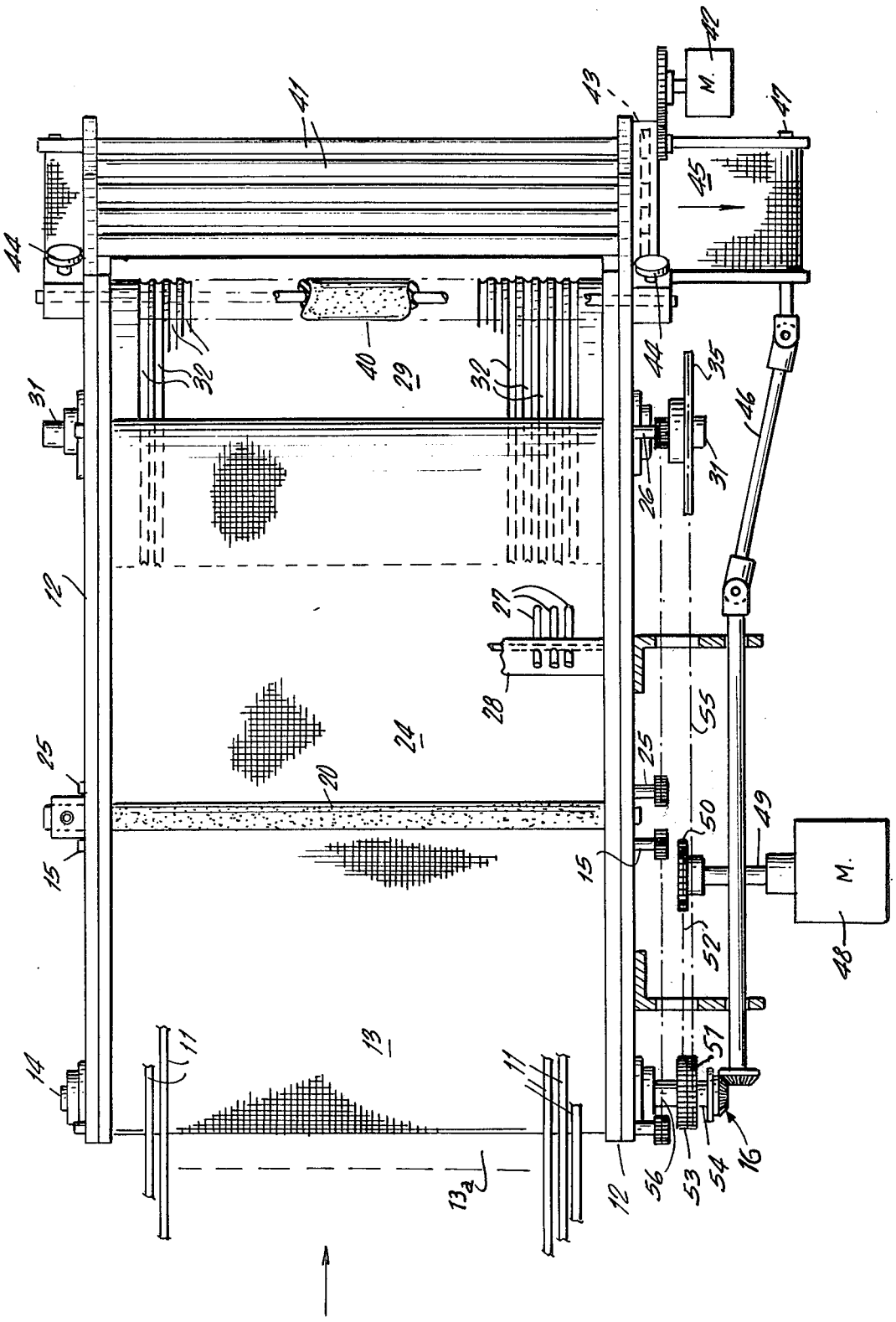
FIG. 4 is a top plan view of the apparatus of FIG. 1 with certain parts omitted for the sake of clarity.

The embodiment shown on the accompanying drawing has been directed to the manufacture of a baked product known as a bread stick. It will be apparent, however, that other food products may be produced employing the present invention and that the presently described apparatus is not intended to be limited to bread sticks.

Referring to the drawings and particularly FIGS. 1 and 4 there is shown a seed applying apparatus 10 for a food product known in the market as a bread stick. Bread sticks are somewhat elongated baked units made of dough and coated with sesame seeds. In order to achieve high speed production of the bread sticks a plurality spaced of dough strings 11 are led from a dough making machine (not shown) on to the seed applying apparatus 10.

The seed applying apparatus 10 is built upon spaced side plates 12 which support the major elements. The dough strings 11 coming from the dough making machine are received upon the loading end 13a of a first wire conveyor belt 13. The wire conveyor belt is formed of woven strands of stainless steel or other suitable metal wire such as is well-known in the food handling art. Spaced rollers 14, 15 journaled at each end in the side plates 12 support the first conveyor belt 13, as best shown in FIG. 1. The first conveyor belt is actuated by a drive (hereinafter more fully described).

As the dough strings 11 leave the first conveyor belt 13 they are led through a dough wetting station 17 (best shown in FIG. 3). The wetting station 17 serves to moisten the dough strings so that the seeds 18 will adhere to the dough more readily. A lower and an upper roller 19, 20, made of some suitable resilient spongy material such as natural or synthetic rubber, polyethelyne, polypropylene, or the like receive the strings. The rollers 19, 20 have a resiliency such that as the dough strings pass between them the rollers, which are in contact with each other, form spaced grooves conforming to the cross sectional shape of the dough strings.

The lower roller 19 is fixed in position and is rotated by the drive 16. The upper roller 20 is mounted between brackets 21 in such manner that it is free to float up and down with respect to the dough strings. The weight of the upper roller 20 is such that it will tend to ride upon the surface of the lower roller 19 at all times.

A source of liquid indicated at 22 is carried by the side plates above the roller 20. The source of liquid is provided with a series of valved pipes 23 which continually supply a metered amount of liquid, such as water, to the roller 20 which in turn transfers it to the dough strings and also the lower roller 19. In this manner a desired wetting is applied to the said strings as they pass between the rollers 19, 20. Excess water is caught in a pan 30 below the wetting station 17.

A second wire conveyor belt 24, similar in construction to the first conveyor belt 13 is disposed in the path of the dough strings 11 as they leave the wetting station 17. The second conveyor belt 24 is carried upon spaced rollers 25, 26 journaled at each end in the side plates 12. Rollers 25, 26 are turned by the drive 16. Between the rollers 25, 26 and overlying the second wire conveyor 24 there is provided a plurality of spaced dough string aligning fingers 27. The aligning fingers float freely within a common support 28 carried at each end by the side plates 12 and serve to keep the dough strings equally spaced as they leave the second conveyor belt 24.

When the dough strings 11 leave the second conveyor belt 24 they are received upon a grooved drum 29. The drum is rotatably carried between the side plates 12 upon a drum shaft 31 journaled in said plates. As best shown in FIG. 2, the grooves 32 of the drum 29 are equally spaced to receive one of the dough strings 11 therein. The grooves 32 are wider in cross section than the strings 11 and of a keystone shape so as to provide a flat bottom portion 33 and sloping sides 34. The shape of the grooves 32 is such that they serve to guide the dough strings 11 and position the seeds 18 about the said strings.

The drum 29 is rotated by means of a pulley 35 secured to the drum shaft 31. The pulley 35 is turned by the drive 16.

A hopper 36 for the seeds 18 is mounted above the side plates 12. The hopper 36 is provided with a discharge chute 37 which directs the flow of seeds coming from the hopper upon the grooved drum along a line just prior to the point of contact of the dough strings with the drum 29. As a result, seeds 18 will be deposited upon the flat bottom portion 33 of the grooves 32 as well as along the sides of the grooves until they cover the dough strings 11 as shown in FIG. 2. A vibrator 38 is coupled to the hopper 36 to insure even and constant flow of the seeds 18 from the said hopper and along the discharge chute 37.

As the wet dough strings 11 with the seeds 18 clinging to them move past the dispensing end 39 of the hopper 37, they pass beneath a press roller 40 made of a soft natural or synthetic rubber or elastomer.

The press roller 40 urges the seeds 18 into firmer contact with the dough strings 11 so that a greater quantity of seeds will be disposed completely around the bread sticks. An adjusting knob 44 permits the amount of force exerted by the press roller to be regulated so as to prevent the seed 18 from becoming crushed.

After leaving the press roller 40, the seeded dough strings 11 are directed out of the seed applying apparatus 10 by a series of driven rollers 41 journaled in the side plates 12. The driven rollers 41 are rotated by a source of rotary power such as the motor 42 (see FIG. 4) which is coupled to the rollers by means of a gear train 43. The seeded dough strings pass into cutting blades, an oven and other apparatus (not shown) for completion.

Excess seeds which will fall from the strings 18 are caught by a transverse conveyor belt 45 disposed beneath the rollers 41 and carried to a suitable bin (not shown) for reuse. The transverse conveyor belt 45 is operated by the drive 16 and an elongated drive shaft 46 interconnecting the driven shaft 47 of the transverse conveyor with a portion of the drive train of the drive 16.

The drive 16 consists of a motor 48 having an output shaft 49 and a pulley 50 secured to the said output shaft. The output shaft pulley 50 is operatively coupled to a double grooved driven pulley 51 on the main shaft 54 of the seed applying apparatus 10 by a belt or chain drive 52. The second groove 53 of the pulley 50 is coupled to the drum pulley 35 as indicated by the dashed lines 55.

A chain and sprocket drive indicated at 56 in FIGS. 1 and 4 transmits power from the main shaft 54 to the rollers 14, 15 to drive the first conveyor belt. A second chain and sprocket drive 57' is coupled to the rollers 25, 26 to drive the second conveyor belt 24. In this manner all of the machine elements transporting the dough strings through the apparatus can be moved in unison.

It will be seen from an examination of FIG. 1 that the roller 26 at the discharge end of the conveyor belt 24 is located directly above the drum 29. As a result, the dough strings 11 are brought into contact with the roller grooves 32 at a point below the top of the drum on the surface beyond the discharge end of the conveyor belt. In this area, the seeds 18 can be directed both into and around the dough strings at the same time, making it possible to produce a bread stick completely covered with seeds in a continuous, relatively high speed operation.

While the preferred embodiment has been shown with two conveyor belts 13, 24, it is within the purview of the present invention to use a single conveyor belt. In addition, the conveyor belts may be disposed horizontally, or at other angular positions without departing from the spirit of the present invention.

Having thus fully described the invention, what is claimed and desired to be secured by Letters Patent is:

1. A seed applying apparatus for food products comprising:
  a. Spaced upstanding rigid side plates;
  b. Spaced elongated rollers transversely carried by the side plates and journaled therein;
  c. At least one conveyor belt carried by the spaced rollers in driven engagement therewith to receive the food products to be seeded;
  d. A loading end and a discharge end on said conveyor belt;
  e. Wetting means disposed in the path of the food products to apply a liquid to the said food products;
  f. An annularly grooved drum carried by the side plates to receive the wetted food products;
  g. A source of seeds disposed above the surface of the drum;
  h. A seed dispensing chute on the seed source;
  i. A dispensing end on the said chute positioned adjacent the drum in the area where the food products first contact the grooved surface of the drum;
  j. Roller means adjacent the dispensing end to urge the seeds into firm contact with the food products;
  k. Means beneath the drum between the side plates to recover excess seeds from the drum;
  l. Means spaced from the discharge end of the conveyor belt to urge the seeded food products away from the said apparatus, and
  m. Drive means operatively coupled to the elongated rollers and the grooved drum to continuously move the food products through the apparatus.

2. Apparatus according to claim 1 in which the conveyor belt is in the form of a first and a second conveyor belt disposed in the same plane and spaced from each other and the wetting station is carried between the said conveyor belts.

3. Apparatus according to claim 2 in which the wetting station comprises a bottom elastomeric roller, a top elastomeric roller and a source of liquid directed upon at least one of said rollers.

4. Apparatus according to claim 3 in which the elastomeric rollers are formed of a spongy material having a resiliency such that the food product will pass between them while the rollers remain in surface contact with each other.

5. Apparatus according to claim 3 in which the wetting station includes a source of liquid and at least one valved pipe to direct a metered amount of liquid upon the rollers.

6. Apparatus according to claim 2 in which the second conveyor belt is provided with means to align the food products during their travel upon the said conveyor belt.

7. Apparatus according to claim 6 in which the food aligning means comprises an elongated support carried at each end by the side plates and a plurality of spaced fingers on said support.

8. Apparatus according to claim 2 in which the discharge end of the second conveyor belt is disposed above the drum to direct the food products toward the dispensing end of the seed dispensing chute.

9. Apparatus according to claim 8 in which the dispensing end of the dispensing chute is located below the highest point of the grooved drum.

10. Apparatus according to claim 2 in which the drum grooves are keystone shaped in cross-section and wider than the food product received therein.

11. Apparatus according to claim 2 in which the means to urge the seeds into firm contact with the food products comprises an elastomeric press roll adjacent the seed dispensing chute.

12. Apparatus according to claim 11 in which the press roll is urged in the direction of the grooved drum by a control knob.

13. Apparatus according to claim 2 in which the means to recover excess seeds comprises a driven conveyor belt transversely disposed beneath the side plates on the discharge side of the apparatus.

14. Apparatus according to claim 2 in which the means to urge the seeded food products away from the apparatus comprises a plurality of driven rollers, transversely carried between the side plates.

15. Apparatus according to claim 2 in which the drive means comprises a source of rotary power and a drive train driven by said source of rotary power.

16. Apparatus according to claim 2 in which the conveyor belts for the food products are disposed at an angle with respect to the horizontal.

* * * * *